United States Patent [19]

Boggs

[11] Patent Number: 4,907,168

[45] Date of Patent: Mar. 6, 1990

[54] TORQUE MONITORING APPARATUS
[75] Inventor: Joseph H. Boggs, Arvada, Colo.
[73] Assignee: Adolph Coors Company, Golden, Colo.
[21] Appl. No.: 142,147
[22] Filed: Jan. 11, 1988
[51] Int. Cl.[4] .............................................. G01L 5/16
[52] U.S. Cl. .................................. 364/508; 364/506; 73/1 C; 73/862.04
[58] Field of Search .......................... 364/508, 551.01; 73/1 B, 1 C, 862.01, 862.02, 862.03, 862.04

[56] References Cited

U.S. PATENT DOCUMENTS

| | | | |
|---|---|---|---|
| 4,094,192 | 6/1978 | Watson et al. | 73/1 B |
| 4,366,874 | 1/1983 | Pidoux et al. | 364/508 |
| 4,426,874 | 1/1984 | Moore | 73/1 B |
| 4,485,681 | 12/1984 | Hatamura | 73/862.04 |
| 4,611,304 | 9/1986 | Butenko et al. | 364/508 |
| 4,640,139 | 2/1987 | Fritz | 364/508 |
| 4,738,145 | 4/1988 | Vincent et al. | 364/508 |

Primary Examiner—Parshotam S. Lall
Assistant Examiner—V. Trans
Attorney, Agent, or Firm—Klaas & Law

[57] ABSTRACT

An apparatus for detecting and measuring torque applied about the central longitudinal axis of the apparatus including a torque receiving frame which may be attached to a device for which torque is to be monitored, a plurality of strain gauges mounted on selected portions of the torque receiving frame for monitoring longitudinal strain therein, a signal processing device for selectively comparing longitudinal strain signals provided by the strain gauges for determining the magnitude and direction of torque applied to the apparatus, a data logging device mounted within the apparatus for collecting and storing data indicative of torque experienced by the apparatus, and a display device connectable to the data logging device for displaying the data stored by the data logging device.

22 Claims, 4 Drawing Sheets

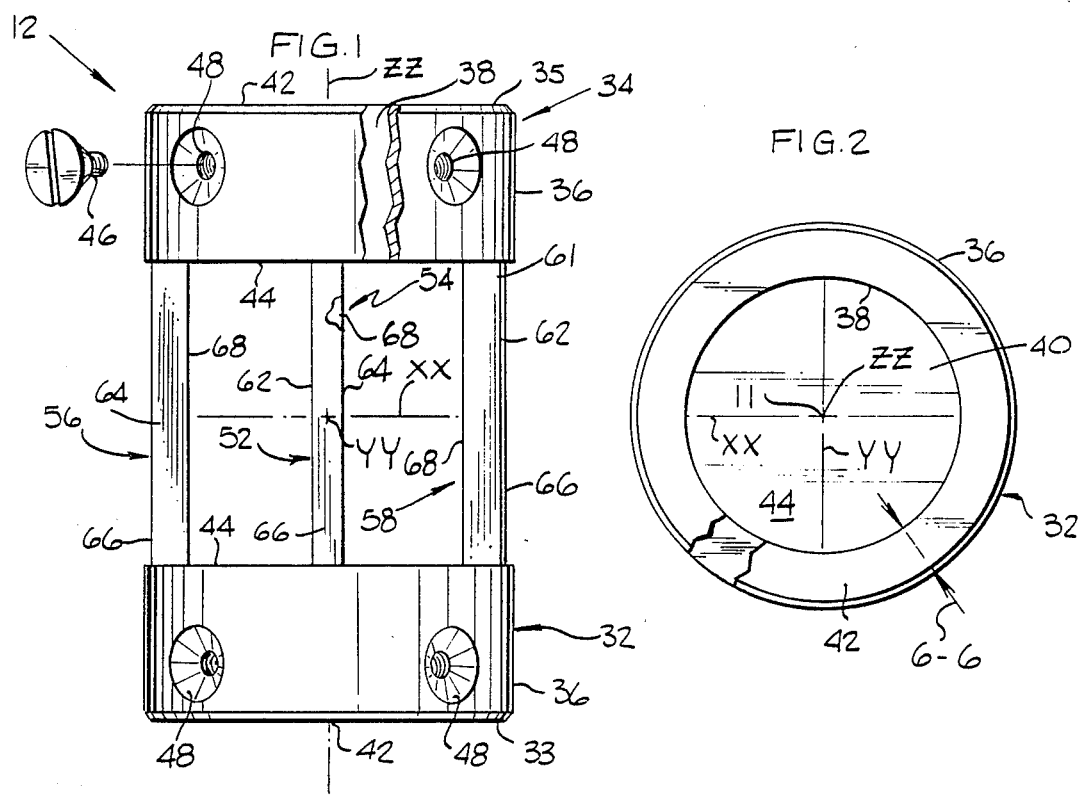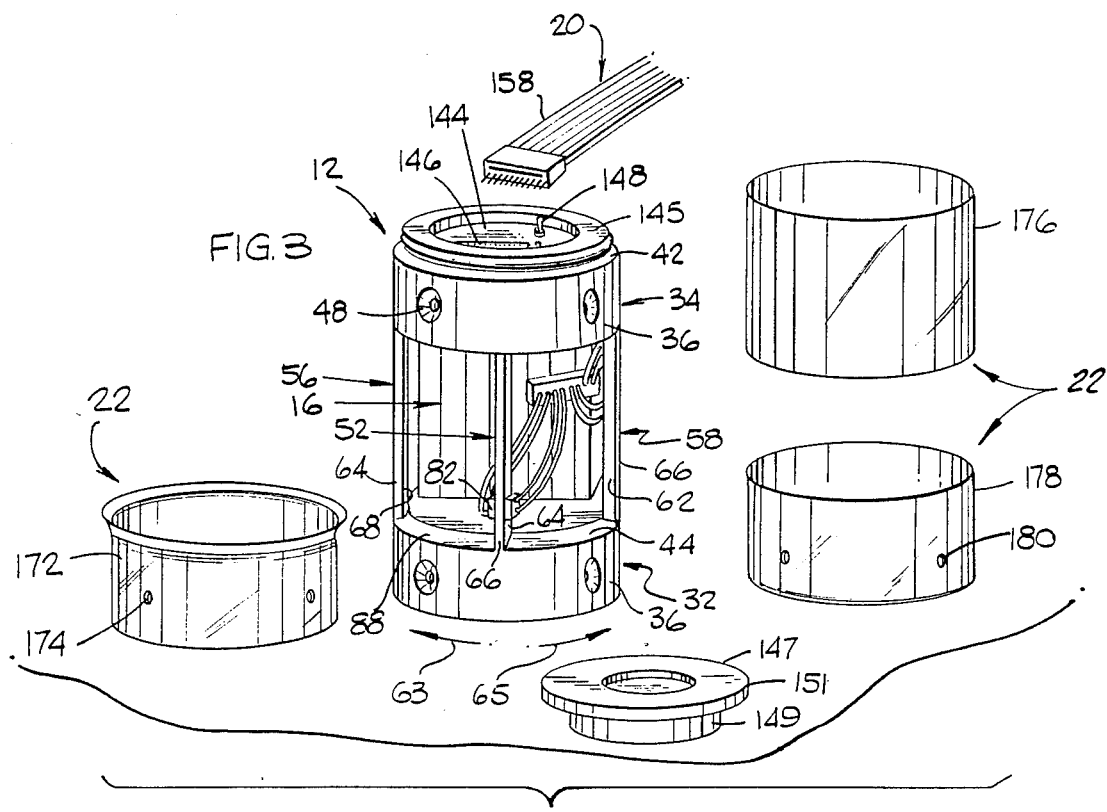

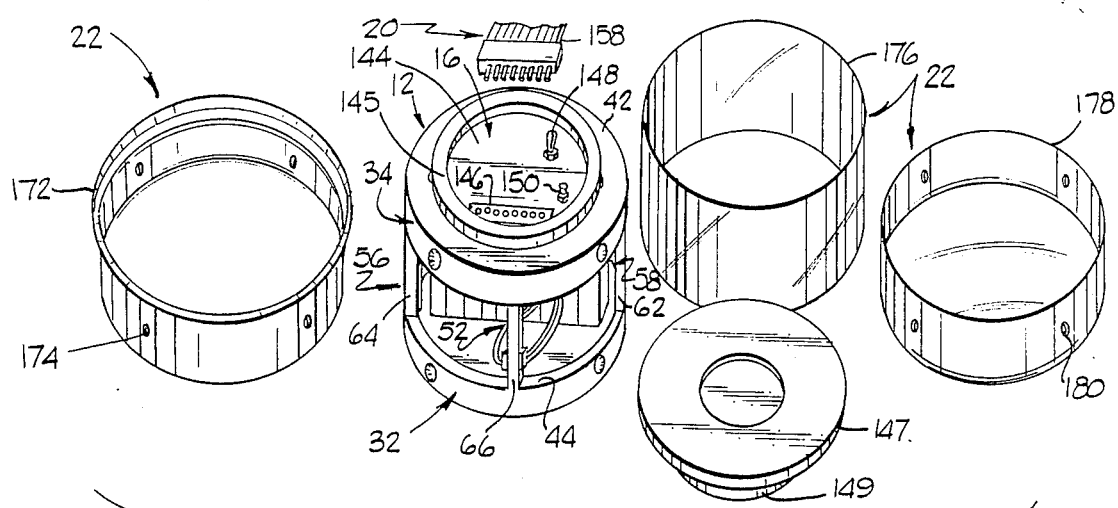
FIG.4
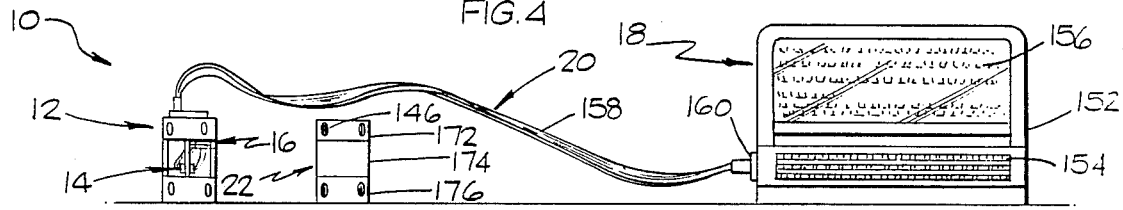
FIG.5
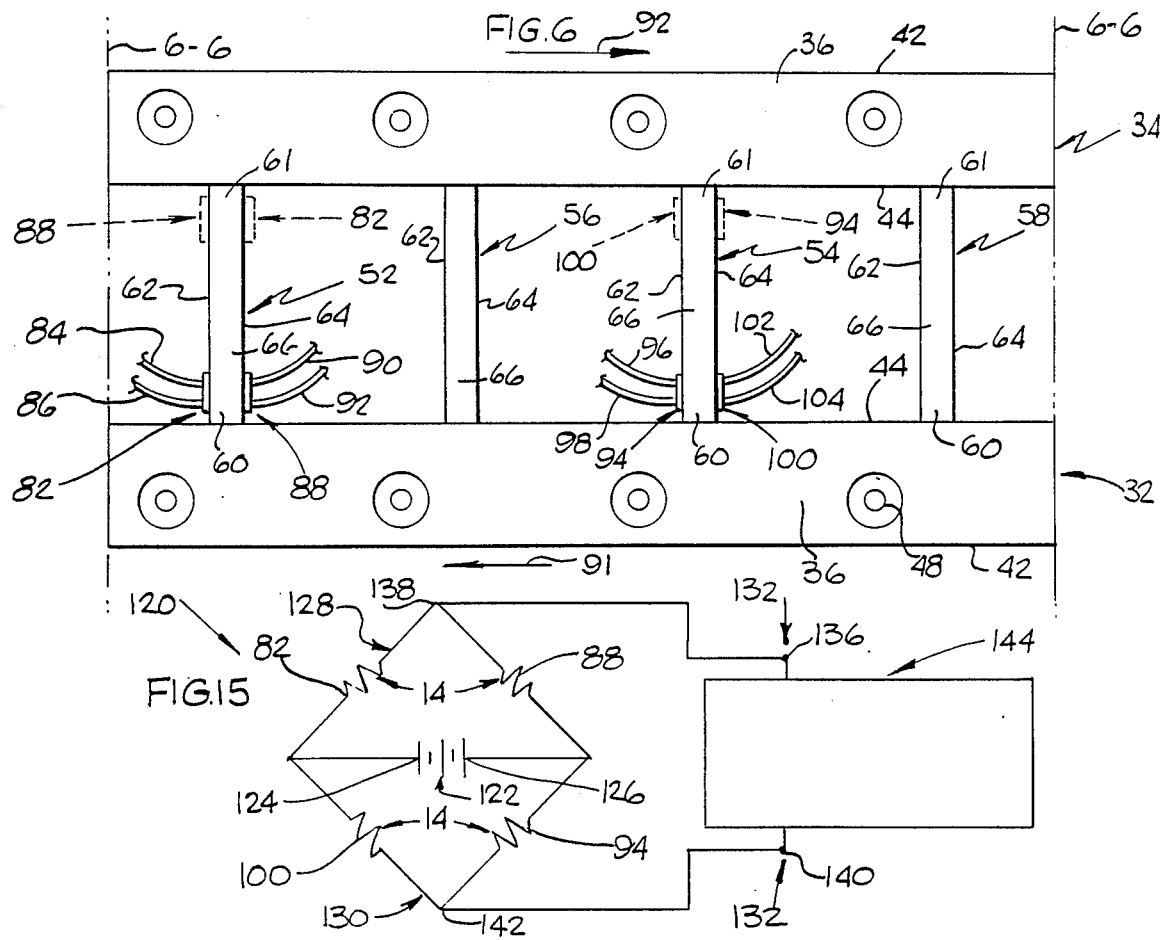

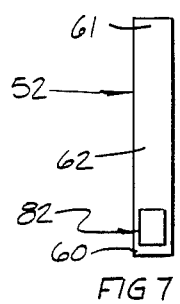
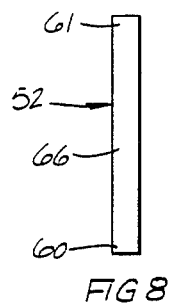
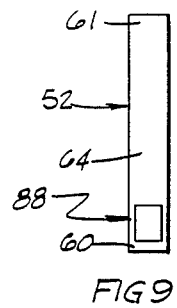
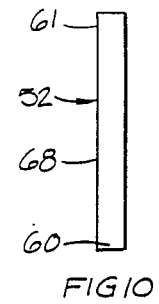
FIG 7   FIG 8   FIG 9   FIG 10
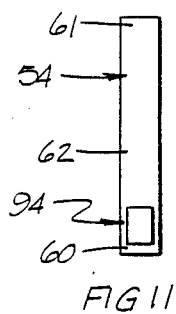
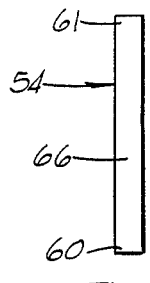
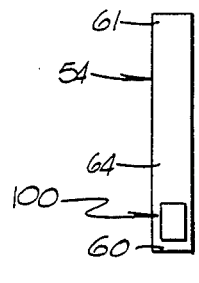
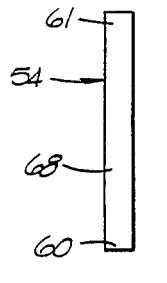
FIG 11   FIG 12   FIG 13   FIG 14
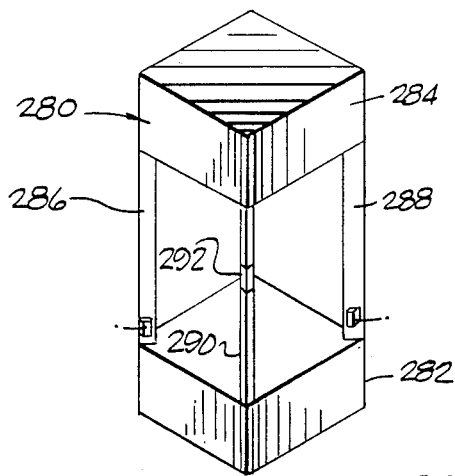
FIG. 20
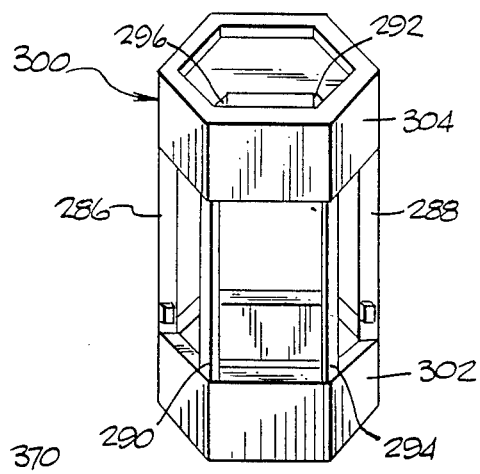
FIG. 21
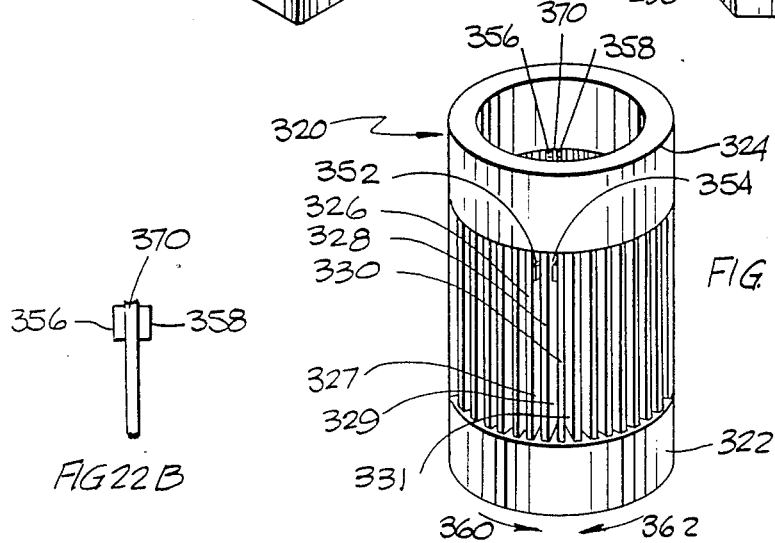
FIG. 22
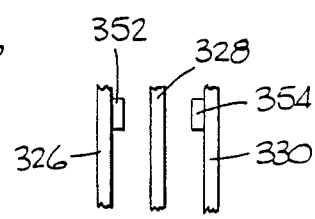
FIG 22B   FIG 22A

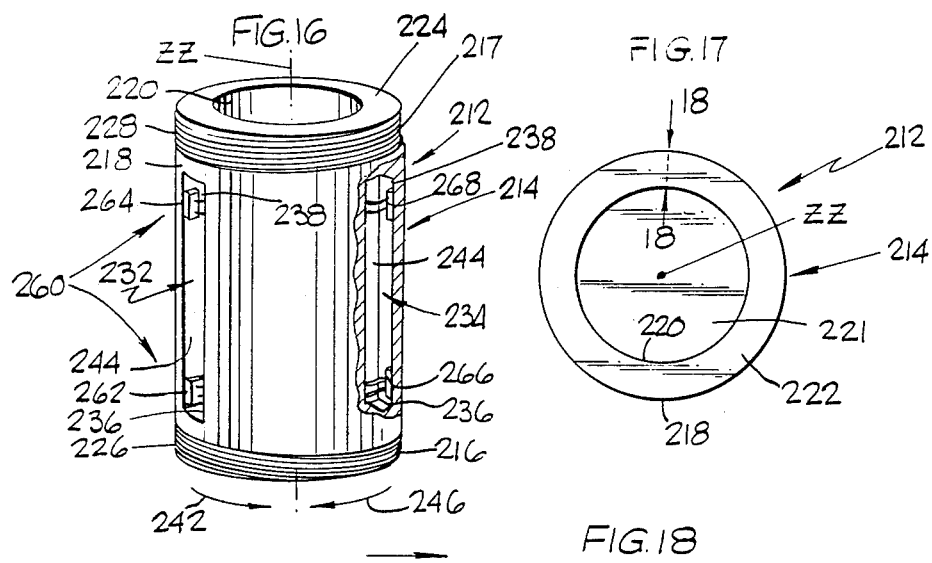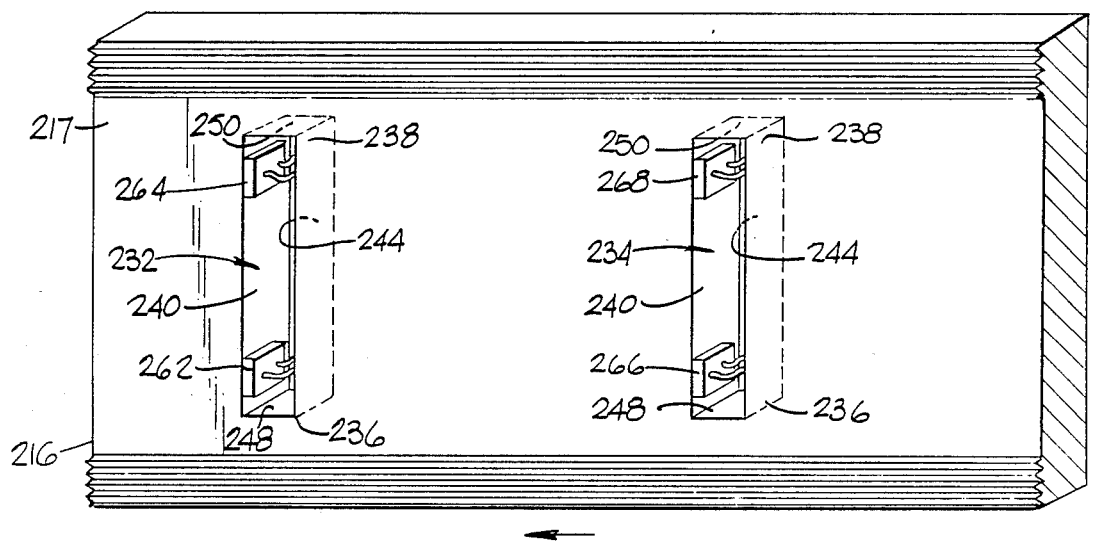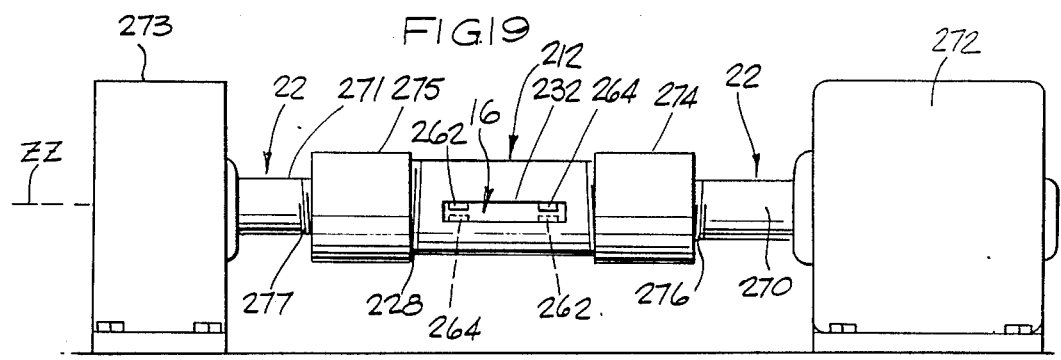

TORQUE MONITORING APPARATUS

BACKGROUND OF THE INVENTION

The present invention relates generally to a torque monitoring apparatus and, more particularly, to a torque monitoring apparatus adapted to be used for measuring the torque experienced by a device under dynamic loading conditions.

During the production and distribution of commercial products, a product unit may be exposed to external forces from a large number of sources. As a result, it may be difficult or impossible to determine which single external force or combination of external forces is responsible for creating a product defect. It is also difficult under such conditions to determine the nature and magnitude of the force(s) which have been exerted on a can body to cause a particular type of defect. For example, in the beverage industry, a beverage can, subsequent to its initial formation into a tubular can body having a bottom wall and an integrally formed sidewall with an open top, undergoes a number of operations performed by a variety of different machines. Typical operations include necking, flanging, filling, can end attachment, packaging, and automated machine transfer of can bodies between the various operating machines. It would be desirable to monitor various force related parameters experienced by can bodies as a result of these various processes to determine how various machinery or the can bodies themselves could be modified to prevent a particular type of damage, e.g. misformed end seams. However, prior to the present invention, such monitoring was impossible in view of the fact that a can body is in generally constant motion as it passes through an operating machine and in view of the restricted space environment within an operating machine. Such movement and space restriction prevent the attachment of a monitoring device and associated sensors and leads, etc., to a can body. A further problem associated with the monitoring of torque experienced by a beverage container is that it is unclear from the prior art how sensors could be mounted on a container to accurately measure torque experienced thereby.

A problem with measuring torque in a dynamic environment is also experienced with rotating machine components. For example, it would be generally desirable to be able to measure the torque experienced by the drive shaft of a truck under various operating conditions. Although torque on a shaft may be readily monitored under various static testing conditions, e.g. by applying a known force to the end of a known length moment arm attached to an end portion of the shaft, there was, prior to the present invention, no accurate method of determining the magnitude of a torque couple which is applied to a rotating shaft, say by an accelerating drive motor at one end and the associated inertial resistance of a transmission, etc., at the other end of the shaft. The rotation of the shaft prevents direct connection of any sensor mounted on the shaft to a data collection device such as a computer. Although electrical contact brushes might be used in association with shaft-mounted sensors, such brush contact, especially under widely-varying velocity conditions, is simply incapable of producing a high-resolution detection signal due to resistance variations between a brush and an associated contact ring. Furthermore, there is no known method for mounting strain gauges, etc., on a rotating shaft for accurately detecting torque experienced by the shaft. Torque measurements derived from measured shaft angular velocity/acceleration and shaft moment of inertia are subject to error because of variables such as the friction in journals, etc., which are difficult to measure or predict and which may vary with velocity.

SUMMARY OF THE INVENTION

The present invention is directed to a torque monitoring apparatus which is adapted to provide a time-based history of torque experienced by a device during use in its normal operating environment. For example, the torque monitoring apparatus may be used to measure the torque experienced by a beverage can body as it passes through various operating machines such as a filler, end seamer, etc. Another example of use of the present invention is in association with a rotating shaft such as the drive shaft of helicopter rotor.

In one embodiment of the invention, the apparatus comprises a pair of longitudinally spaced, rigid, transverse members which are fixedly connected by a plurality of preferably equal length, longitudinally extending members arranged in a symmetrical configuration about a central longitudinal axis. A first and second pair of longitudinal strain measuring means are mounted on a pair of diametrically oppositely positioned longitudinal members. The position at which the strain gauges are mounted on the longitudinal members are selected in a manner such that the strain gauge signals may be compared with one another by a data processing means to determine the magnitude and direction of any torque couple which is applied to the transverse members about the central longitudinal axis of the apparatus. In a preferred embodiment of the invention, the strain sensors are identical conventional strain gauges which are connected in a wheatstone bridge circuit which provides a circuit output which is proportional to the torque about the central longitudinal axis of the apparatus. The output of the wheatstone bridge is preferably received by a data logging device which is physically mounted in an internal cavity of the torque monitoring apparatus, thus obviating the need for any external electrical connections to the apparatus during the period in which torque data is being collected. The data logging apparatus is adapted to be connected to a convention data display device which may include a conventional microprocessor and CRT display screen or electrostatic plotting unit, etc., which may display the torque data in the form of a torque and time coordinate graph or other convenient display format.

Thus, the invention may comprise an apparatus for detecting and measuring torque applied about the central longitudinal axis thereof, comprising: (a) a first radially extending member; (b) a second radially extending member, said second radially extending member being longitudinally spaced from said first radially extending member; (c) a plurality of circumferentially symmetrically spaced elongate, longitudinally extending members connecting said first and second radially extending members comprising: (i) a first elongate longitudinally extending member having a first generally radially and longitudinally extending surface portion facing in a first circumferential direction and a second generally radially and longitudinally extending surface portion facing in a second circumferential direction opposite said first circumferential direction and having a first end portion fixedly attached to said first radially extending member and having a second end portion fixedly attached to said second radially extending member; and (ii) a second elongate longitudinally extending member having a first generally radially and longitudinally extending surface portion facing in said first circumferential direction and a second generally radially and longitudinally extending surface portion facing in said second circumferential direction and having a first end fixedly attached to said first radially extending member and having a second end fixedly attached to said second radially extending member; (d) first and second strain detecting means operably associated with at least one end portion of at least one of said first and second radially and longitudinally extending surface portions of said first elongate member for generating a first and a second strain detection signal indicative of the strain in said associated portions of said first elongate member; (e) third and fourth strain detecting means operably associated with at least one end portion of at least one of said first and second radially and longitudinally extending surface portions of said second elongate member for generating a third and a fourth strain detection signal indicative of the strain in said associated portions of said second elongate member; and (f) data processing means for receiving and processing said first, second, third and fourth strain detection signals for determining the amount of torque being applied to said apparatus about said central longitudinal axis thereof and for generating a torque signal indicative thereof.

The invention may also comprise an apparatus for detecting and measuring the amount of torque applied about the central longitudinal axis thereof, comprising: (a) a generally tubular member having a first end and a second end; (b) a first elongate window cutout extending through said tubular member and defining a first generally radially and longitudinally extending first window first sidewall surface facing in a first circumferential direction and a second generally radially and longitudinally extending first window second sidewall surface facing in a second circumferential direction opposite said first circumferential direction; (c) a second elongate window cutout extending through said tubular member and defining a generally radially and longitudinally extending second window first sidewall surface facing in said first circumferential direction and a generally radially and longitudinally extending second window second sidewall surface facing in said second circumferential direction; said second window cutout being positioned diametrically opposite said first window cutout; (d) each of said longitudinally extending window sidewall surfaces comprising a first end positioned proximate said tubular member first end and a second end positioned proximate said tubular member second end; (e) first and second strain detection means operably associated with selected end portions of at least one of said longitudinally extending sidewall surfaces of said first window cutout; (f) third and fourth strain detection means operatively associated with selected end portions of at least one of said longitudinally extending sidewall surfaces of said second window cutout; and (g) data processing means for processing said first, second, third and fourth strain detection signals for determining the amount of torque being applied to said apparatus about said central longitudinal axis thereof.

The invention may also comprise an apparatus for detecting and measuring torque applied about the central longitudinal axis of the apparatus, comprising: (a) a generally tubular member having a first end and a second end and comprising an outer sidewall surface, an inner sidewall surface, a first end surface, and a second end surface; (b) a plurality of symmetrically arranged axially and circumferentially extending openings extending between said inner wall surface and said outer wall surface of said tubular member, each said opening defining a pair of circumferentially oppositely facing, radially and axially extending, opening wall surfaces, each said opening wall surface having a first end positioned proximate said tubular member first end and a second end positioned proximate said tubular member second end; (c) a first and second strain detecting means operatively associated with end portions of at least one of said opening wall surfaces which are located in a first, relatively small, circumferential region of said tubular member for detecting the relative strain in said associated portion of said opening wall surface; (d) a third and fourth strain detecting means operatively associated with end portions of at least one of said opening wall surfaces which are located in a second, relatively small, circumferential region of said tubular member positioned approximately diametrically opposite said first, relatively small, circumferential region; and (e) data processing means for receiving and processing said first, second, third and fourth strain detection signals for determining the amount of torque being applied to said apparatus about said central longitudinal axis thereof and for generating a torque signal indicative thereof.

BRIEF DESCRIPTION OF THE DRAWING

An illustrative and presently preferred embodiment of the invention is shown in the accompanying drawing in which:

FIG. 1 is an elevation view of a torque receiving frame of a torque monitoring apparatus.

FIG. 2 is a cut-away bottom plan view of the torque frame of FIG. 1.

FIG. 3 is a perspective view of a torque receiving frame and internally-mounted data processing device and associated data transfer device, and portions of a severed can body which is to be monitored for torque loading.

FIG. 4 is another perspective view of the apparatus shown in FIG. 3.

FIG. 5 is an elevation view of the torque monitoring apparatus of the present invention showing two torque receiving frame modules, one of which is attached to a severed can body, and showing a display device which is connected to an internal data processing device of one of the torque receiving modules by a data transfer cable.

FIG. 6 is a topological development of the torque receiving frame of FIG. 1 illustrating the placement of sensors thereon.

FIGS. 7 14 14 are elevation views of different surface portions of elongate member portions of the torque receiving frame of FIG. 1.

FIG. 15 is a schematic view illustrating a wheatstone bridge portion and a data collection portion of a data processing.

FIG. 16 is a perspective view of another embodiment of a torque receiving frame.

FIG. 17 is a bottom plan view of the torque receiving frame of FIG. 16.

FIG. 18 is a perspective topological development illustrating the torque receiving frame of FIGS. 16 and 17.

FIG. 19 is a schematic illustration of a torque monitoring apparatus used for measuring the torque experienced by a rotating shaft.

FIGS. 20-22 are perspective view of three other embodiments of torque receiving frames for a torque monitoring apparatus.

FIGS. 22A and 22B are detail views of the torque receiving frame of FIG. 20.

DETAILED DESCRIPTION OF THE INVENTION

One preferred embodiment of the torque monitoring apparatus 10 of the present invention, which is presently the best mode contemplated, is illustrated in FIGS. 1-15. As illustrated in FIG. 5, the torque monitoring apparatus may comprise a torque receiving frame 12, a plurality of strain sensing means 14 operably attached to the torque receiving frame, and a data processing means 16 positioned within the torque receiving frame 12 for receiving and storing data signals produced by the strain sensing means. The apparatus may further comprise a data display means 18 for receiving data from the first data processing means and for displaying such data, and a data transfer means 20 for transferring data from the data processing means 16 to the data display means 18. The torque receiving frame 12 is adapted to be attached to a device 22 which is to be monitored for torque applied thereto.

Torque Receiving Frame 12

As best illustrated in FIG. 1, the torque receiving frame 12 comprises a central, axially (longitudinally) extending axis ZZ, a first, central, radially (transversely) extending axis XX which is perpendicular to axis ZZ and which intersects axis ZZ at the longitudinal center 11 of frame 12, and a second, central, radially (transversely) extending axis YY intersecting axes XX and ZZ and perpendicular to both. The torque receiving frame 12 comprises a first radially extending member 32, which is preferably a tubular member, positioned at a first longitudinal end 33 of the frame and a second radially extending member 34, which is preferably tubular and identical to first member 32, positioned at a second longitudinal end 35 of the frame. Each of the tubular members 32, 34 comprises an outer cylindrical wall surface 36, an inner cylindrical wall surface 38 which defines a cylindrical interior cavity 40, a ring-shaped, generally radially and circumferentially extending exterior end surface 42, and a ring-shaped, generally radially and circumferentially extending interior end surface 44. Each tubular member also comprises connection means 46, 48 for connection of the tubular member to portions of a device 22 to be tested. The connection means may comprise a plurality of screws 46 adapted to be received in a plurality of recessed threaded bores 48 extending into the sidewall of each tubular member. In one preferred embodiment, each tubular member is constructed of aluminum and has an outer diameter of 2.5 inches, an inner diameter of 1.8 inches, and an axial length of 1.0 inch.

The torque receiving frame 12 also comprises first, second, third and fourth elongate, longitudinally extending members 52, 54, 56, 58. As best illustrated in FIGS. 1, 3 and 7-14, each of the longitudinally extending members comprises a first end 60 which is fixedly attached to the first tubular member 32, and a second end 61 which is fixedly attached to the second tubular member 34. Each of the elongate longitudinally extending members comprises a generally axially (longitudinally) and radially (transversely) extending surface 62 which faces in a first circumferential (peripheral) direction 63, FIG. 3. Each of the elongate members also comprises a generally axially and radially extending surface 64 which faces in a second circumferential direction 65 opposite to the first circumferential direction. Each of the members also comprises a generally axially and circumferentially extending surface 66 facing radially outwardly and a generally axially and circumferentially extending surface 68 facing radially inwardly. In a preferred embodiment, the elongate longitudinally extending members 52, 54, 56, 58 are identical in construction and may be, e.g. rectangular cross section, aluminum members having an axial dimension of 2.0 inches, a radial dimension of 0.3 inch, and a circumferential dimension of 0.15 inch which are integrally formed with the tubular members 32, 34. The longitudinal members 52, 54, 56, 58 are located symmetrically about the circumference of the tubular members 32, 34 with the first elongate member 52 positioned diametrically opposite the second elongate member 54 and with the third elongate member 56 positioned diametrically opposite the fourth elongate member 58, with each of the elongate members being evenly spaced between adjacent members.

Strain Sensing Means

The strain sensing means 14 are best illustrated in FIG. 6. FIG. 6 is a representation of the frame means in which the tubular members 32, 34 have been severed by a radially and axially extending cutting plane 6—6, FIG. 2, and have then been topologically "unwrapped" and shown in generally planar form in much the same manner that a map of the earth is shown in planar form. The strain sensing means may comprise a first strain gauge 82 which is oriented to detect longitudinal strain in an associated portion of the frame 12. Strain gauge 82 has a first lead 84 and a second lead 86 and is fixedly attached to radially extending surface 62 of first elongate member 52 at the first end 60 thereof at a fixed predetermined distance, e.g. 0.0 inches, from first tubular member 32. The strain sensing means 14 also comprises a second longitudinally oriented strain gauge 88 having a first lead 90 and a second lead 92 which is positioned on surface 64 of elongate member 52 at the first end 60 thereof at the same axial distance from tubular member 13 as that of first strain gauge 82. As indicated in phantom in FIG. 6, sensor 82 may alternately be positioned on surface 64 of member 52 at second end 61 thereof at the same longitudinal distance from tubular member 34 as that which it was positioned from tubular member 32 when located at end 60 on surface 62. Similarly, second sensor 88 may be positioned as indicated in phantom at end 61 on surface 62 of member 52 opposite the placement of sensor 82 shown in phantom. Strain sensing means 14 also comprises a third strain gauge 94 having first lead 96 and second lead 98 positioned on surface 62 of member 54 at lower end 60 thereof at the same longitudinal distance from tubular member 32 as that of first strain gauge 82. The strain sensing means 14 also comprises a fourth strain gauge 100 having a first lead 102 and a second lead 104 positioned in fixed relationship with surface 64 at lower end 60 thereof directly opposite sensor 94. Sensor 94 may be alternately positioned in fixed relationship with surface 64 at the top end 61 of member 54, and fourth sensor 100 may be alternately positioned in fixed relationship with surface 62 of member 54 at the second end 61 thereof at the same distance from member 34 as the sensors were positioned from member 32 in their first described placement. It will be understood that the strain gauges are positioned to sense the relative strain of the members in the axial (longitudinal) direction, i.e. in a direction parallel to axis ZZ. All of the strain gauges 82, 88, 94, 100 have the same strain/electrical resistance response characteristics and may comprise a conventional commercially available strain gauge such as that sold under the product designation EA-12-060CC-350 by Micro-Measurements Division of Measurements Group, Inc., of P.O. Box 27777, Raleigh, N.C., 27611.

Data Processing Means

The data processing means 16 is adapted to receive sensing signals from the strain sensing mean 14 and to compare and process these signals to provide a signal indicative of the magnitude of a torque couple applied about axis ZZ to members 32 and 34 of frame 12 and also to determine the direction of the torque couple. In one preferred embodiment illustrated in FIG. 15, the data processing means 16 comprises a wheatstone bridge circuit arrangement 120. The wheatstone bridge circuit includes an electrical energy source 122 such as a battery having a first terminal 124 which may be a positive terminal and a second terminal 126 which may be a negative terminal. The voltage drop across the terminals 124, 126 may be 5 volts. The wheatstone bridge circuit 120 comprises a first circuit branch 128 including strain gauge 82 and strain gauge 88 connected in series with one terminal of strain gauge 82 connected to battery terminal 124 and one terminal of strain gauge 88 connected to battery terminal 126 with the electrical connection between the two strain gauges 82, 84 represented at 138. The wheatstone bridge circuit also comprises a second circuit branch 130 in which strain gauge 100 and strain gauge 94 are connected in series between the battery terminals 124, 126 with a terminal of strain gauge 100 connected to battery terminal 124 and a terminal of strain gauge 94 connected to battery terminal 126 and with the connection between the two gauges indicated at 142. The wheatstone bridge circuit comprises a signal output means 132 including a first output signal terminal 136 connected at 138 between sensors 82 and 84 and comprising a second output signal terminal 140 which is connected at 142 between sensors 100 and 94. The voltage drop across terminals 136, 140 is linearly proportional to a torque couple applied to tubular members 32, 34 about axis ZZ for sensors with linear strain/resistance response characteristics. The polarity of the voltage drop between 136 and 140 is indicative of the direction of the torque couple which is applied to tubular members 32 and 34. In a preferred embodiment of the invention, the signal output terminals 136 and 140 are connected to a signal reading, processing and storing device which periodically, e.g. 100 times per second, reads the voltage across terminals 136, 140 and stores the voltage value thus read in association with a number indicative of the time at which the voltage reading was taken. The signal reading, processing and storing device 144 is preferably a compact unit positioned within an encasement member 145, FIGS. 3 and 4, which is mounted in a cavity within frame 12 defined by the tubular members 32, 34 and elongate members 52, 54, 56, 58. The signal reading, processing and storing device may be provided with a data output port 146 to enable transfer of data out of the device at a selected time and may comprise an on/off switch 148 which causes the device 144 to become operative and to begin reading and storing torque and time values from the time that it is switched on to the time that it is switched off, or until its data storage capabilities are exhausted. The data is preferably stored in a memory form which is not erased simply by turning the unit off, but which must be erased by a further input command such as may be provided by another operation of another switch 150 or other conventional input devices. A signal reading, processing and storing device having the features such as described for 144 above, is commercially available under the product name Datalogger, from Kelmet, Inc., of 569 West Covina Blvd., San Dimas, Calif., 91773.

Display Means and Data Transfer Means

Display means 18 may comprise a conventional microprocessor 152 such as any IBM PC compatible computer such as an NEC-Multispeed which is commercially available from Connecting Point of 8966-Z West Bowles Ave., Littleton, Colo., 80123. The microprocessor is preferably provided with a conventional input terminal such as a keyboard 154 which may be of the type sold in association with the above-described microprocessor. The display means 18 also comprises a conventional display terminal such as a cathode ray tube (CRT) or a liquid crystal display (LCD) 156 or a conventional printer, plotter, etc. The display device may display this data in one or more forms such as tables, graphs, etc. The display means 18 may be provided with conventional software for changing or modifying the format in which such data values are expressed. Data transfer means 20 may comprise a conventional computer cable 158 adapted to be connected between output port 146 of the first data processing means 16 and a conventional data input port 160 of the display means. Data processing means 16 and display means 18 may be provided with conventional interface hardware and software such as is commercially available from Kelmet, Inc., of 569 West Covina Blvd., San Dimas, Calif., 91773, for facilitating data transfer. Electronic data transfer is conventional and well-known in the art. As illustrated in FIGS. 3 and 4, in one embodiment of the invention the device to be tested 22 is an aluminum can body which has been severed into an upper can body portion 172 having attachment holes 174 therein, a middle can body portion 176, and a lower can body portion 178 having attachment holes 180 therein. Can body portions 172 and 180 are fixedly attached by screws 146 to torque receiving frame 12 with portion 172 attached to tubular member 34, portion 176 attached to tubular member 32, and portion 176 closely slidingly received about the periphery of longitudinal members 52, 54, 56, 58 and abuttingly engaged at upper and lower edges thereof by can portions 172 and 176.

It will be appreciated by those having skill in the art after reading this disclosure that the above-described apparatus 10 provides an accurate indication of the magnitude and direction of a torque couple applied to tubular members 32 and 34 about axis ZZ. The above-described wheatstone bridge circuit 120 will cause all external forces on members 32 and 34 which do not produce a torque couple about axis ZZ (e.g. a compressive axial force, a torque couple about axis XX) to be cancelled out. Thus, the apparatus produces a time-based database indicative only of torque about axis ZZ. Another embodiment of the torque frame invention will now be discussed with reference to FIGS. 16–19.

Other Embodiments

In another preferred embodiment of the invention illustrated in FIGS. 16 through 19, torque frame 212 comprises a generally pipe-shaped tubular member 214 having a first end 216 and a second end 217. The tubular member 214 comprises a cylindrical outer wall surface 218 and a cylindrical inner wall surface 220 defining a cylindrical cavity 221. The tubular member comprises a first ring-shaped end wall surface 222 and a second ring-shaped end wall surface 224. Connection means for connecting the first and second end 216, 217 of the tubular member to a device 22 for which the torque is to be measured may be provided by threaded end portions 226, 228, which may be conventional pipe threads. A plurality of symmetrically-spaced elongate window cutout portions which extend radially through the tubular member 214 are provided. In the illustrated embodiment, the plurality of elongate window cutout portions is axially centered on tubular member 214 and comprises a first elongate window cutout portion 232 and an identical diametrically oppositely positioned elongate window cutout portion 234. Each of the elongate window cutout portions comprise a first end 236 positioned proximate the first end 216 of the tubular member, and a second end 238 positioned proximate the second end of the tubular member. Each of the window cutout portions comprises a first radially and axially extending window sidewall surface 240 which faces in a first circumferential direction 242. Each window cutout portion also comprises a second radially and axially extending window sidewall surface 244 facing in a second circumferential direction 246 opposite direction 242. Each window cutout portion also comprises a first radially and circumferentially extending sidewall surface 248 positioned at end 236 and a second radially and circumferentially extending sidewall surface 250 positioned at end 238.

Strain sensing means 260 are provided for sensing the axial strain in selected portions of the window cutout in a manner similar to that described above with respect to sensor means 14. In the embodiment of FIGS. 16-19, sensor means 260 comprise a first strain sensor 262, a second strain sensor 264, a third strain sensor 266, and a fourth strain sensor 268, each having a pair of leads and being connected in a wheatstone bridge circuit identical to that described above in FIG. 15, with sensor 262 corresponding to sensor 82, sensor 264 corresponding to sensor 88, sensor 266 corresponding to sensor 94, and sensor 268 corresponding to sensor 100. As illustrated in FIGS. 16 and 18, and in solid lines in FIG. 19, first strain sensor 262 may be positioned in first window cutout 232 on window sidewall surface 240 at the first end 236 thereon at a predetermined fixed distance from surface 248. Sensor 264 may be positioned in window cutout 232 in fixed relationship with surface 240 at the end opposite to the placement of sensor 262 and positioned at a longitudinal distance from surface 250 the same amount as the distance of sensor 262 from surface 248. As illustrated in FIG. 19, sensor 262 may alternately be positioned on surface 244 of the first window cutout at the second end 238 thereof, and sensor 264 may alternatively be positioned at the first end 236 of surface 244. Sensor 266 may be positioned within window cutout 234 at the first end 236 of surface 240 at the same longitudinal distance from surface 248 as that of sensor 262. Sensor 268 may be positioned in cutout 234 at end 238 of surface 240 at the same longitudinal distance from surface 250 as sensor 266 is located from surface 248. Sensors 266 and 268 may also be positioned on surface 244 of the second window cutout, with sensor 266 being positioned at end 238 and sensor 268 being positioned at end 236. The data processing means 216 to which the sensors 262, 264, 266, 268 are connected may be identical to the data processing means 16 described above for the first embodiment. The display means 18 which displays the data collected by data processing means 16 may also be identical to that described above in FIG. 5, as may be the data transfer means 20.

As illustrated in FIG. 19, the frame 214 may be connected between a first drive shaft portion 270 operably connected to a drive motor 272 and a second drive shaft portion 271 which is operably connected to a gearbox 273. The torque frame 212 is connected to the drive shaft portions 270, 271 as by conventional threaded coupling members 274, 275 which are threadingly attached to threaded end portions 226, 228 of frame 12 and threaded ends 276, 277 of drive shaft portions 270, 271, respectively. In the embodiment illustrated in FIG. 19, the apparatus 10 will measure the torque couple exerted on drive shaft portions 270, 271 by drive motor 272 and gear box 273. Although the tubular member of FIG. 16 has been shown attached to the drive shaft portions 270, 271 of FIG. 19 and the frame assembly of FIG. 1 has been shown in association with a truncated beverage container, it will appreciated that the different frame embodiments 12, 212 of the torque-sensing apparatus 10 are interchangeable. Due to the greater structural integrity of the embodiment illustrated in FIG. 16, this device may be preferable in certain high-torque environments. On the other hand, the double cantilever beam construction of FIG. 1 may be preferable when high resolution torque measurement is required.

FIG. 20 represents another embodiment 280 of a torque frame comprising a solid, transverse member 282 having a square cross section, and a second transverse member 284 identical to member 282. In this embodiment, a longitudinal member 286, 288, 290, 292 is attached between corner portions of transverse members 282, 284 with a pair of sensors (only one shown on each member) operably mounted on opposite longitudinal members 286 and 288 in the same manner described above with reference to FIG. 6.

FIG. 21 represents another frame embodiment 300 of torque frame comprising a first transverse tubular member 302 having a hexagonal cross section and a second transverse tubular member 304 identical to member 302. Longitudinally extending members 304, 306, 308, 310, 312, 314 are attached between opposite corner portions of the two transverse members 302, 304, and a pair of sensors are mounted onto oppositely positioned longitudinal members 286, 288.

Various cross sectional configurations of a tubular embodiment similar to the cylindrical tubular embodiment illustrated in FIG. 16 may also be used as a torque frame 12. FIG. 22 represents an embodiment of a torque frame 320 comprising a first tubular member 322 and a second tubular member 324 with a plurality of relatively circumferentially thin longitudinal members 326, 328, 330, etc., provided by a plurality of window cutouts 327, 329, 331, etc., having a circumferential opening dimension of approximately the same size as the circumferential thickness of the longitudinal members 326, 328. In this embodiment, sensors pairs may be mounted on diametrically opposite or approximately diametrically opposite longitudinal member surfaces as described above with reference to FIGS. 1-15, or may be mounted on diametrically opposite or approximately diametrically opposite window surfaces as described with reference to FIGS. 16-18. It will, of course, be appreciated that window cutout surfaces and longitudinal member sidewall surfaces in an embodiment such as illustrated in FIG. 22 may be synonymous.

In such an embodiment as illustrated in FIG. 22, it is preferable, but not absolutely necessary, for the sensor pair on each diametrically opposite side of the frame to be associated with the same longitudinal member or the same window cutout. For example, as best shown in FIG. 22A, a sensor pair including a first sensor 352 may be positioned on a longitudinally and radially extending surface of member 326 facing in a first circumferential direction 360, and a second sensor 354 may be positioned on a longitudinally and radially extending surface of member 328 facing in a second circumferential direction 362. As shown in FIG. 22B, a second sensor pair 356, 358 may be positioned on opposite longitudinal and radially extending surfaces of a longitudinal member 370 which is positioned approximately diametrically opposite members 326, 328, 330.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An apparatus for detecting and measuring torque applied about the central longitudinal axis thereof, comprising:
(a) a first radially extending member;
(b) a second radially extending member, said second radially extending member being longitudinally spaced from said first radially extending member;
(c) a plurality of circumferentially symmetrically spaced elongate, longitudinally extending members connecting said first and second radially extending members comprising:
  (i) a first elongate longitudinally extending member having a first surface portion facing in a first circumferential direction and a second surface portion facing in a second circumferential direction opposite said first circumferential direction and having a first end portion fixedly attached to said first radially extending member and having a second end portion fixedly attached to said second radially extending member; and
  (ii) a second elongate longitudinally extending member having a first surface portion facing in said first circumferential direction and a second surface portion facing in said second circumferential direction and having a first end fixedly attached to said first radially extending member and having a second end fixedly attached to said second radially extending member;
(d) first and second strain detecting means operably associated with at least one end portion of at least one of said first and second surface portions of said first elongate member for generating a first and a second strain detection signal indicative of the strain in said associated portions of said first elongate member;
(e) third and fourth strain detecting means operably associated with at least one end portion of at least one of said first and second surface portions of said second elongate member for generating a third and a fourth strain detection signal indicative of the strain in said associated portions of said second elongate member; and
(f) data processing means for receiving and processing said first, second, third and fourth strain detection signals for determining the amount of torque being applied to said apparatus about said central longitudinal axis thereof and for generating a torque signal indicative thereof.

2. The apparatus of claim 1 wherein:
(a) said third strain detection means being fixedly attached to said first surface portion of said second elongate member at said first end thereof; and
(b) said fourth strain detection mean being fixedly attached to one of:
  (i) said first surface portion of said second member at said second end thereof; and
  (ii) said second surface portion of said second member at said first end thereof.

3. The apparatus of claim 1 wherein:
(a) said first strain detection means being fixedly attached to said first surface portion of said first elongate member at said first end thereof; and
(b) said second strain detection means being fixedly attached to one of:
  (i) said second surface portion of said first elongate member at said first end thereof; and
  (ii) said first surface portion of said first elongate member at said second end thereof.

4. The apparatus of claim 3 wherein:
(a) said third strain detection means being fixedly attached to said second surface portion of said second elongate member at said second end thereof; and
(b) said fourth strain detection mean being fixedly attached to one of:
  (i) said first surface portion of said second member at said second end thereof; and
  (ii) said second surface portion of said second member at said first end thereof.

5. The apparatus of claim 1 wherein said first radially extending member comprise a ring member having a central longitudinal axis substantially coaxial with said central longitudinal axis of said apparatus.

6. The apparatus of claim 5 wherein said second radially extending member comprises a second ring member having a central longitudinal axis substantially coaxial with said first ring member central longitudinal axis.

7. The apparatus of claim 1, said data processing means comprising wheatstone bridge means for combining said strain detection signals for producing an output signal representative of torque applied about said central longitudinal axis of said apparatus.

8. The apparatus of claim 1 or 7, said data processing means comprising data storage means responsive to said torque signal for storing data indicative of the value of said torque signal over a selected period of time.

9. The apparatus of claim 8, said data processing means comprising display means operably connectable to said data storage means for receiving stored data from said data storage means and for displaying said data in human-readable form.

10. The apparatus of claim 8, said data storage means comprising a compact data storage unit positioned within a central enclosure defined by said first and second radially extending members and said first and second longitudinally extending members.

11. An apparatus for detecting and measuring the amount of torque applied about the central longitudinal axis thereof, comprising:
(a) a generally tubular member having a first end and a second end;
(b) a first elongate window cutout extending through said tubular member and defining a first generally radially and longitudinally extending first window first sidewall surface facing in a first circumferential direction and a second generally radially and longitudinally extending first window second sidewall surface facing in a second circumferential direction opposite said first circumferential direction;
(c) a second elongate window cutout extending through said tubular member and defining a generally radially and longitudinally extending second window first sidewall surface facing in said first circumferential direction and a generally radially and longitudinally extending second window second sidewall surface facing in said second circumferential direction; said second window cutout being positioned diametrically opposite said first window cutout;
(d) each of said longitudinally extending window sidewall surfaces comprising a first and positioned proximate said tubular member first end and a second end positioned proximate said tubular member second end;
(e) first and second strain detection means operably associated with selected end portions of at least one of said longitudinally extending sidewall surfaces of said first window cutout;
(f) third and fourth strain detection means operatively associated with selected end portions of at least one of said longitudinally extending sidewall surfaces of said second window cutout; and
(g) data processing means for processing said first, second, third and fourth strain detection signals for determining the amount of torque being applied to said apparatus about said central longitudinal axis thereof; said data processing means comprising data storage means responsive to said torque signal for storing data indicative of the value of said torgue signal over a selected period of time; said data storage means comprising a compact data storage unit positioned within a central enclosure defined by said tubular member.

12. The apparatus of claim 11, said signal processing means comprising wheatstone bridge means comprising:
(a) battery means for providing an electrical potential comprising a first terminal and a second terminal;
(b) first circuit branch means comprising a first resistor and a second resistor connected to one another in series, said first resistor being connected to said first battery means terminal, said second resistor being connected to said second battery means terminal;
(c) said circuit branch means comprising a third resistor and a fourth resistor connected to one another in series, said fourth resistor being connected to said first battery means terminal said third resistor being connected to said second battery means terminal;
(d) voltage differential output means for providing an output voltage signal indicative of the relative balance of said resistors in said first and second circuit branches comprising a first output terminal electrically connected to the connection between said first and second resistors and a second output terminal electrically connected to the connection between said third and fourth resistors; and
(e) wherein said first, second, third and fourth strain detecting means comprising first, second, third and fourth strain gauges, respectively, and wherein said first, second, third and fourth strain gauges comprise said first, second third and fourth resistors, respectively.

13. The apparatus of claim 11, said data processing means comprising display means operably connectable to said data storage means for receiving stored data from said data storage means and for displaying said data in human-readable form.

14. The apparatus of claim 11, said tubular member comprising an outer, cylindrical sidewall surface, an inner, cylindrical sidewall surface, a ring-shaped first end surface, and a generally ring-shaped second end surface.

15. The apparatus of claim 14 wherein:
(a) said third strain detection means being fixedly attached to said second window second surface at said second end thereof; and
(b) said fourth strain detection means being fixedly attached to one of:
 (i) said second window first surface at said second end thereof; and
 (ii) said second window second surface at said first end thereof.

16. The apparatus of claim 11 wherein:
said first strain detection means being fixedly attached to said first window first surface at said first end thereof; and
said second strain detection means being fixedly attached to one of:
 (i) said first window first surface at said second end thereof; and
 (ii) said first window second surface at said first end thereof.

17. The apparatus of claim 16 wherein:
(a) said third strain detection means being fixedly attached to said second window first surface at said first end thereof; and
(b) said fourth strain detection means being fixedly attached to one of:
 (i) said second window first surface at said second end thereof; and
 (ii) said second window second surface at said first end thereof.

18. An apparatus for detecting and measuring torque applied about the central longitudinal axis of the apparatus, comprising:
(a) a generally tubular member having a first end and a second end and comprising an outer sidewall surface, an inner sidewall surface, a first end surface, and a second end surface;
(b) a plurality of symmetrically arranged axially and circumferentially extending openings extending between said inner wall surface and said outer wall surface of said tubular member, each said opening defining a pair of circumferentially oppositely facing, radially and axially extending, opening wall surfaces, each said opening wall surface having a first end positioned proximate said tubular member first end and a second end positioned proximate said tubular member second end;
(c) a first and second strain detecting means operatively associated with end portions of at least one of said opening wall surfaces which are located in a first, relatively small, circumferential region of said tubular member for detecting the relative strain in said associated portion of said opening wall surface;

(d) a third and fourth strain detecting means operatively associated with end portions of at least one of said opening wall surfaces which are located in a second, relatively small, circumferential region of said tubular member positioned approximately diametrically opposite said first, relatively small, circumferential region; and (e) data processing means for receiving and processing said first, second, third and fourth strain detection signals for determining the amount of torque being applied to said apparatus about said central longitudinal axis thereof and for generating a torque signal indicative thereof; said data processing means comprising data storage means responsive to said torque signal for storing data indicative of the value of said torque signal over a selected period of time; said data storage means comprising a compact data storage unit positioned within a central enclosure defined by said tubular member.

19. The apparatus of claim 18 wherein:
(a) said third strain detection means being fixedly attached at a second end of one of said opening wall surfaces which face in said second circumferential direction; and
(b) said second strain detection means being fixedly attached at one of:
 (i) a second end of one of said opening wall surfaces which faces in said first circumferential direction; and
 (ii) a first end of one of said opening wall surfaces which faces in said second circumferential direction.

20. The apparatus of claim 18, said data processing means comprising display means operably connectable to said data storage means for receiving stored data from said data storage means and for displaying said data in human-readable form.

21. The apparatus of claim 18 wherein:
(a) said first strain detection means being fixedly attached at a first end of one of said opening wall surfaces which faces in a first circumferential direction; and
(b) said second strain detection means being fixedly attached at one of:
 (i) a second end of one of said opening wall surfaces which faces in said first circumferential direction; and
 (ii) a first end of one of said opening wall surfaces which faces in a second circumferential direction opposite said first circumferential direction.

22. The apparatus of claim 21 wherein:
(a) said third strain detection means being fixedly attached at a first end of one of said opening wall surfaces which face in said first circumferential direction; and
(b) said fourth strain detection means being fixedly attached at one of:
 (i) a second end of one of said opening wall surfaces which faces in said first circumferential direction; and
 (ii) a first end of one of said opening wall surface which faces in said second circumferential direction.

* * * * *